Aug. 15, 1933.  J. H. McCORMICK ET AL  1,922,253
VENDING MACHINE
Filed March 23, 1931  3 Sheets-Sheet 1
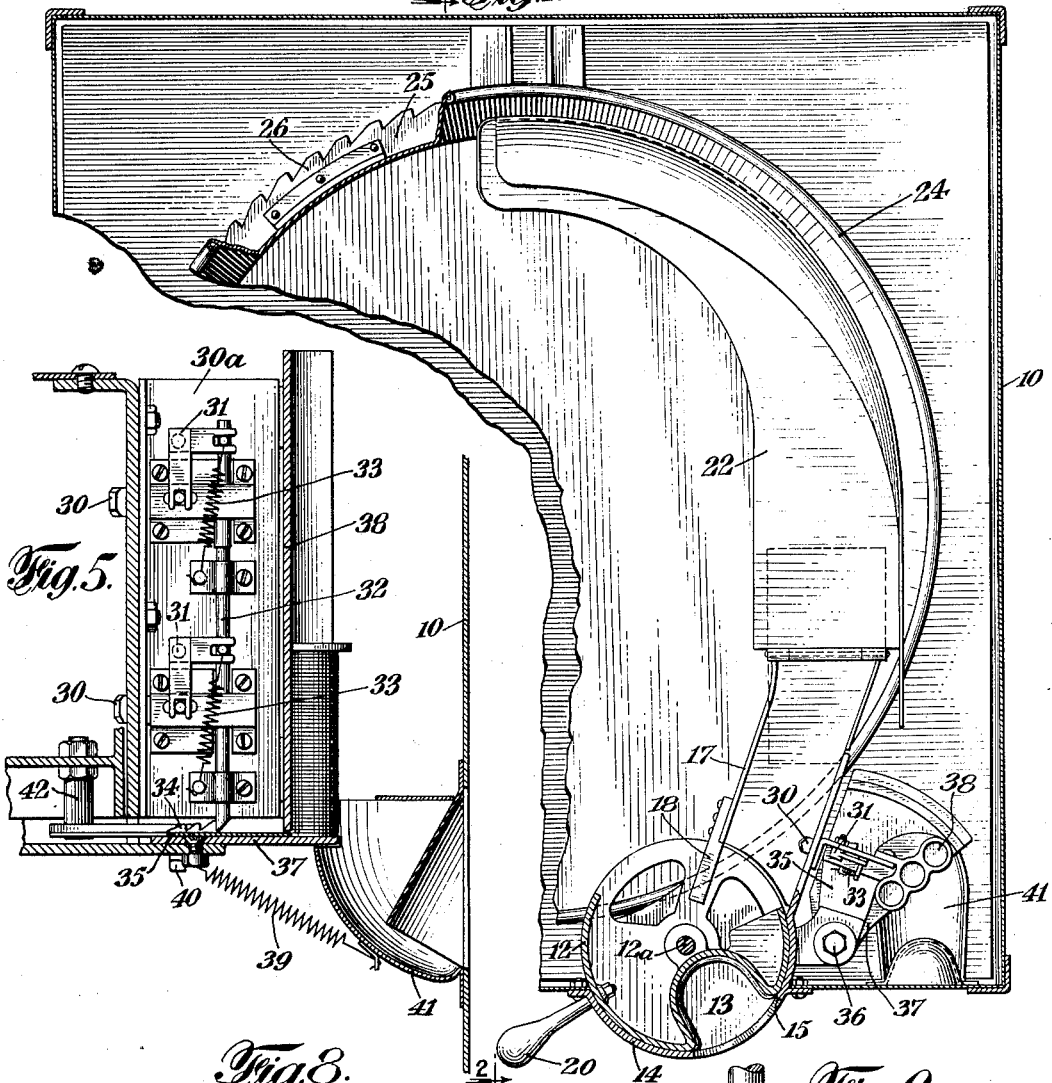
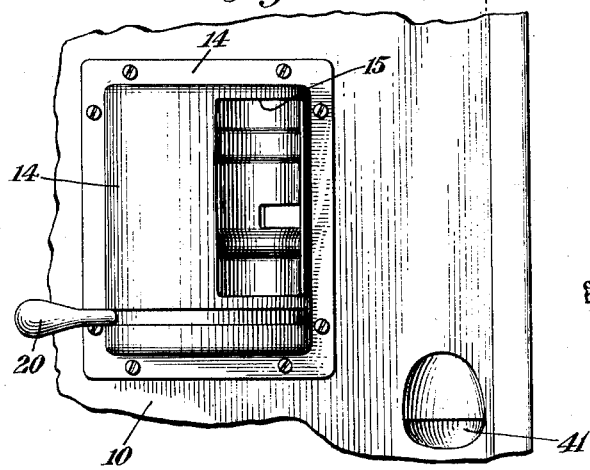
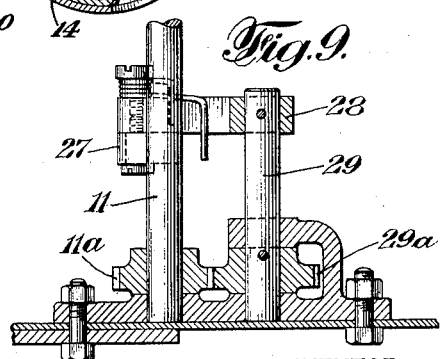
INVENTOR
John H. McCormick
BY Frank M. Bender
Kenyon & Kenyon
ATTORNEYS.

Aug. 15, 1933.   J. H. McCORMICK ET AL   1,922,253
VENDING MACHINE
Filed March 23, 1931   3 Sheets-Sheet 2

INVENTOR
John H. McCormick
BY Frank M. Bender
Kenyon & Kenyon
ATTORNEYS

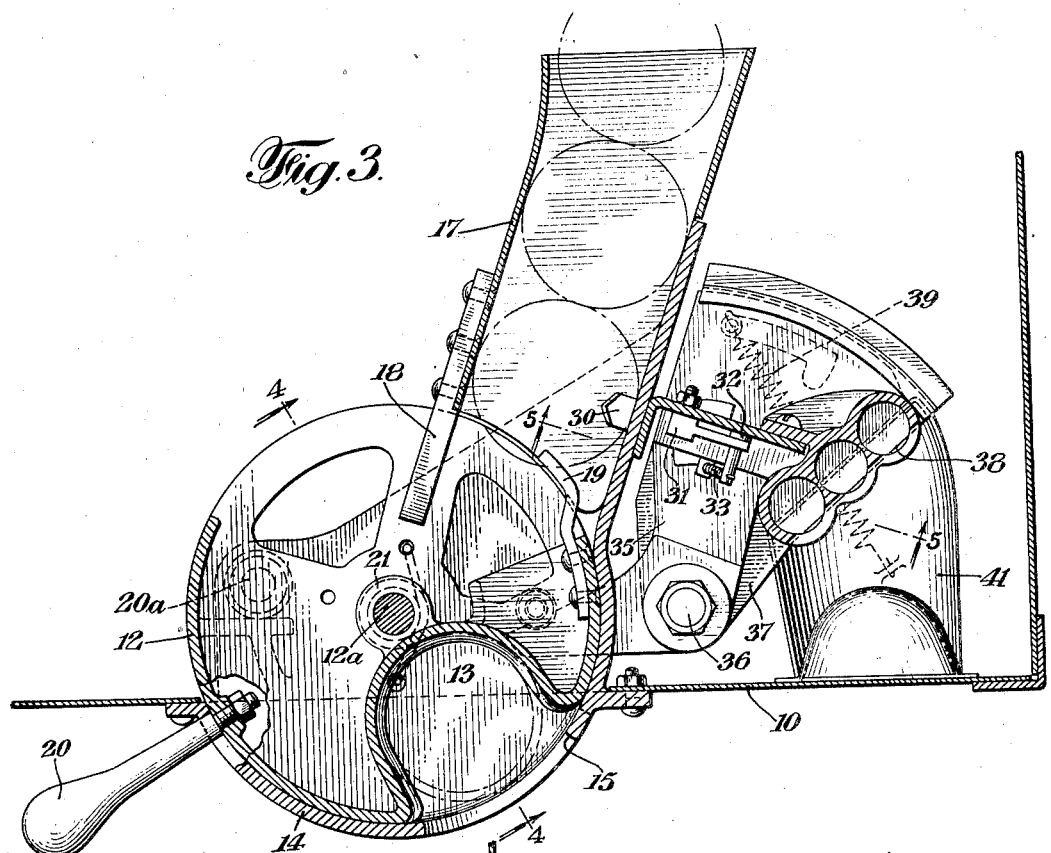
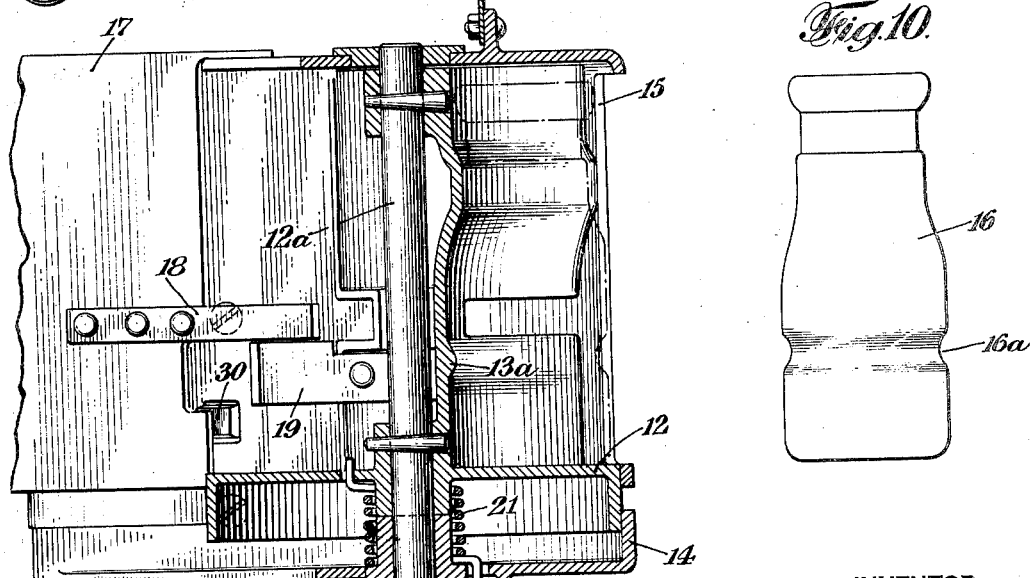

Patented Aug. 15, 1933

1,922,253

UNITED STATES PATENT OFFICE 1,922,253

VENDING MACHINE

John H. McCormick and Frank M. Bender, Williamsport, Pa., assignors to Vendi Cater, Inc., Williamsport, Pa., a Corporation of Pennsylvania Application March 23, 1931. Serial No. 524,520

7 Claims. (Cl. 194—4)

This invention relates to bottle redeeming mechanism and has for an object mechanism which will refund to the operator of the mechanism a predetermined sum of money upon presentation to the mechanism of a bottle of predetermined size and shape.

Other objects, novel features and advantages of this invention will be apparent from the following specification and accompanying drawings, wherein:

Fig. 1 is a horizontal section, partly broken away, through an apparatus embodying the invention;

Fig. 3 is an enlarged fragmentary section generally similar to Fig. 1;

Fig. 4 is a section on the line 4—4 of Fig. 3;

Fig. 5 is a fragmentary section on the line 5—5 of Fig. 3;

Fig. 8 is a fragmentary elevation;

Fig. 9 is a section on the line 9—9 of Fig. 7, and

Fig. 10 is an elevation of a bottle used with the mechanism.

Figure 2:
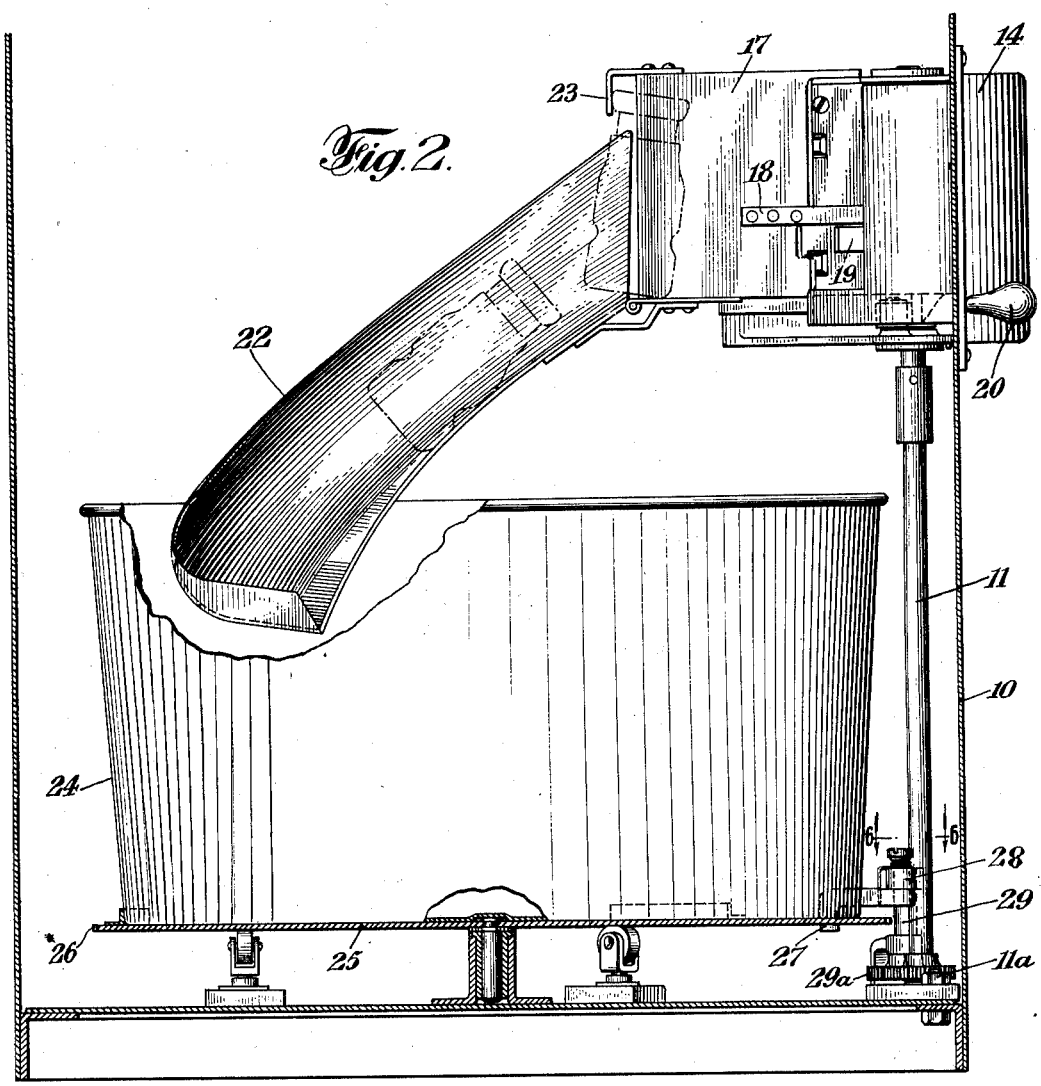
Fig. 2 is a fragmentary section substantially on the line 2—2 of Fig. 1.

The bottle redeeming mechanism is contained within a casing 10, which, if desired, may also contain mechanism for vending full bottles, such mechanism not being shown in the present drawings. A vertical shaft 11 is journalled within the casing and has attached to its upper end a carrier 12 provided with a bottle receiving pocket 13. The carrier 12 is circular in cross section and fits snugly in a housing 14 carried by the casing 10, this housing being provided with an aperture 15 through which a bottle may be inserted into the pocket 13. The carrier 12 is supported by a shaft 12$^a$ which is journalled in the top and bottom walls of the housing 14. A bottle 16 which will be redeemed by the device is shown in Fig. 10 and is of the same general contour as ordinary milk bottles, but is provided near its base with a peripheral groove 16$^a$ and the pocket 13 is provided with a projection 13$^a$ which is designed to fit into the groove 16$^a$. The pocket 13 is of such size that it is necessary for the groove 16$^a$ to be fitted over the projection 13$^a$ in order that the bottle may be fully received within the pocket to permit rotation of the carrier. Thus, if a bottle of the same general overall dimensions as the bottle 16, but without the groove 16$^a$ is introduced into the pocket 13, it will project slightly from the pocket and engage the housing wall when an attempt is made to rotate the carrier and thus prevent operation thereof.

Within the casing there is provided a chute 17 into which the carrier is adapted to discharge a bottle. An arm 18 projects from one wall of the chute and a slot is provided in the wall of the pocket 13 so that upon rotation of the carrier the arm 18 is projected into the pocket and serves to direct a bottle from the pocket into the chute. The carrier is also provided with an arm 19 which on the return movement of the carrier engages a bottle in the chute to move the same along the chute. The carrier is provided with an operating handle 20 and a spring 21 tends to return the carrier to the position shown in Fig. 1 after which it has been rotated to deliver a bottle to the chute 17. A stop 20$^a$ limits the rotation of the carrier 12 under the influence of the spring 21. A chute 22 is pivoted to the end of the chute 17 and a stop 23 is provided to be engaged by the top of the bottle to cause the same to fall over onto its side and slide down the chute 22 from the end of which it is delivered into a tub 24 supported upon a turntable 25.

Figure 6:
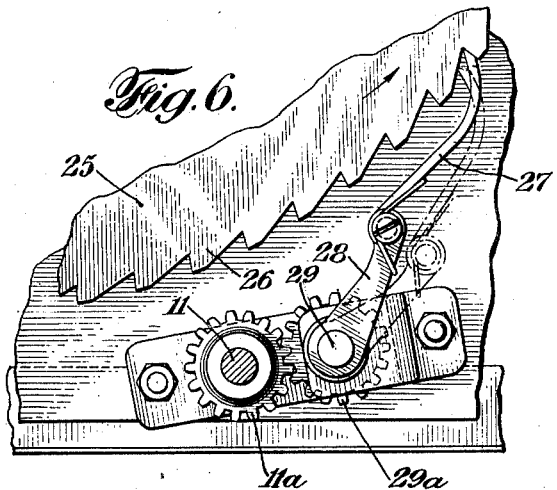
Fig. 6 is a fragmentary section on the line 6—6 of Fig. 2.
Figure 7:
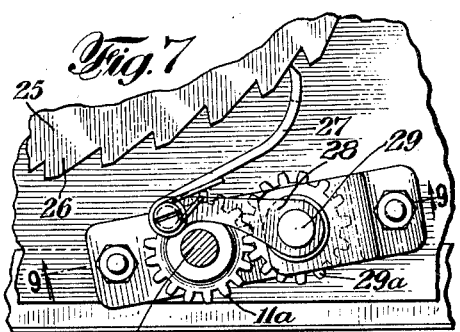
Fig. 7 is a view similar to Fig. 6 but with the elements differently positioned.

The turntable 25 is provided on its periphery with ratchet teeth 26 which are adapted to be engaged by a pawl 27 mounted on the free end of an arm 28 fixed to a shaft 29. The shafts 11 and 29 are provided with pinions 11$^a$ and 29$^a$, the teeth of which are in mesh. When the carrier is in the position shown in Fig. 1, the ratchet 27 takes the position shown in Fig. 7. When the carrier 12 is actuated to deliver a bottle to the chute 17 the pawl assumes the position shown in Fig. 6 and in so doing advances the turntable through a predetermined arc.

A pair of feelers 30 extend through one wall of the chute and are adapted to be actuated by a bottle delivered to the chute from the carrier. These feelers are supported by a vertical plate 30$^a$ attached to the chute 17 and are connected through bell crank levers 31 with a vertical slide 32 also carried by the plate 30$^a$. Inward movement of the feelers lifts the slide against the action of the springs 33. The lower end of the slide 32 engages ratchet teeth 34 formed on an ejector 35 pivotally mounted by means of the bolt 36 on a plate 37 supported by the housing 14. The plate 37 underlies the lower ends of a plurality of coin magazines 38 which are supported by the plate 30$^a$. The lower ends of the coin magazines are spaced slightly from the plate 37 and the ejector 35 is adapted to swing through the slot thus provided and eject coins from the magazines. The ejector is actuated by a spring 39, one end of which is attached to a lug 40 carried by the ejector and the other end of which is attached to the wall of a delivery chute 41 into which coins are discharged from the magazines. The slide 32 acts as a detent for the ejector 35 and a stud 42 mounted on the carrier 12 is arranged to engage a portion of the ejector 35 to reset the same after it has been actuated by the spring 39. When the machine is at rest the carrier and ejector are arranged as shown in Figs. 1 and 3.

In the operation of this device, a bottle 16 to be redeemed is placed in the pocket 13 with the rib 13$^a$ received in the peripheral groove 16$^a$. The handle 20 is then operated to swing the carrier through an arc of approximately 120°, thus delivering the bottle into the chute 17. The bottle engages the feelers 30 and pushes them inwardly to lift the detent 32 whereupon the ejector is released and pulled forward by the spring 39 to eject the lowermost coins in the magazines 38. Upon release of the handle 20, the spring 21 returns the carrier to starting position and during the return movement of the carrier, the arm 19 pushes the bottle into the chute a sufficient distance to allow the feelers to return to their normal position under the influence of the springs 32, thereby returning the detent into operative position. During the return of the carrier to its original position, the lug 42 by engagement with a portion of the ejector returns the same into the position shown in Fig. 1 and the detent engages the ratchet teeth 34. Also, during the rotation of the carrier to deliver a bottle to the chute 17, the turntable 25 is advanced a step by means of the ratchet 27. Successive operations of the carrier cause the previously redeemed bottles to be pushed along the chute 17 and into the chute 22 by means of which they are delivered into the tub 24 which is rotated slightly each time a bottle is redeemed. The bottles are thus systematically arranged in the tub.

Should there be inserted into the pocket 13 a bottle of the same overall dimensions as a bottle 16, but without the peripheral groove 16$^a$, such bottle will not be completely received within the pocket, but will project slightly therefrom and engage the housing wall when an attempt is made to rotate the carrier. Also, should there be inserted a bottle of sufficiently less diameter than the bottle 16 to be completely received within the pocket 13, such bottle, although delivered to the chute 17 would not actuate the feelers 30 sufficiently to release the ejector. Consequently, no coins would be ejected.

The magazines 38 are adapted to contain coins of different denominations and use may be made of one or more of these chutes depending upon the redeeming price of the bottle and the combination of coins required to make up this price. The size and shape of the pocket 13 and the arrangement of the feelers 30 is such that a bottle of the shape shown in Fig. 10 is required for proper operation of the device. This arrangement prevents fraudulent redemption of bottles and insures a vendor of bottled goods contained in such bottles against loss in the redemption of bottles.

It is of course understood that various modifications may be made in the structure above described, without in any way departing from the spirit of the invention as defined in the appended claims.

We claim:

1. In combination, an oscillatable carrier for receiving and transferring bottles, a chute, means for discharging a bottle from said carrier into said chute, a rotatable container into which said chute discharges, and means for rotating said container a predetermined amount for each oscillation of the carrier.

2. In combination, an oscillatable carrier for receiving and transferring bottles, a chute, means for discharging a bottle from said carrier into said chute, a rotatable container into which said chute discharges, and ratchet means for effecting step by step rotation of the container upon oscillation of the carrier.

3. In combination, an oscillatable carrier for receiving and transferring bottles, a chute, means for discharging a bottle from said carrier into said chute, a pivoted extension for said chute, a rotatable container into which said extension discharges, and means for effecting step by step rotation of said container upon oscillation of said carrier.

4. In combination, an oscillatable carrier for receiving and transferring bottles, a chute, means for discharging a bottle from said carrier into said chute, a spring actuated coin ejector, a detent for said ejector, means operable by a bottle in said chute for rendering said detent inoperative, a rotatable container into which said chute discharges, means for effecting step by step rotation of said container upon oscillation of said carrier and means for re-setting the ejector by the carrier.

5. In combination, a carrier for receiving and transferring bottles, said carrier having a pocket shaped to receive a bottle having its bottom portion of larger diameter than its upper portion and a peripheral groove in its bottom portion, the wall of said pocket being provided with a projection to extend into said peripheral groove when the bottle is placed in the pocket, a chute, means to discharge a bottle from said carrier into said chute, a rotatable container into which said chute discharges, and means for effecting step by step rotation of said container upon oscillation of said carrier.

6. In combination, a carrier for receiving and transferring bottles, said carrier having a pocket shaped to receive a bottle having its bottom portion of larger diameter than its upper portion and a peripheral groove in its bottom portion, the wall of said pocket being provided with a projection to extend into said peripheral groove when the bottle is placed in the pocket, a chute, means to discharge a bottle from said carrier into said chute, a rotatable container into which said chute discharges, means for effecting step by step rotation of said container upon oscillation of said carrier, a spring actuated coin ejector, a detent for said ejector, feeling mechanism projecting into said chute, connections between said feeling mechanism and the detent for actuating the latter by the former, and means for resetting said ejector by said carrier.

7. In combination, a carrier for receiving and transferring bottles, said carrier having a pocket shaped to receive a bottle having its bottom portion of larger diameter than its upper portion and a peripheral groove in its bottom portion, the wall of said pocket being provided with a projection to extend into said peripheral groove when the bottle is placed in the pocket, a chute, means to discharge a bottle from said carrier into said chute, a rotatable container into which said chute discharges, means for effecting step by step rotation of said container upon oscillation of said carrier, a spring actuated coin ejector, a detent for said ejector, means operable by a bottle in said chute to render said detent inoperable, and means for resetting the ejector by said carrier.

JOHN H. McCORMICK.
FRANK M. BENDER.